UNITED STATES PATENT OFFICE.

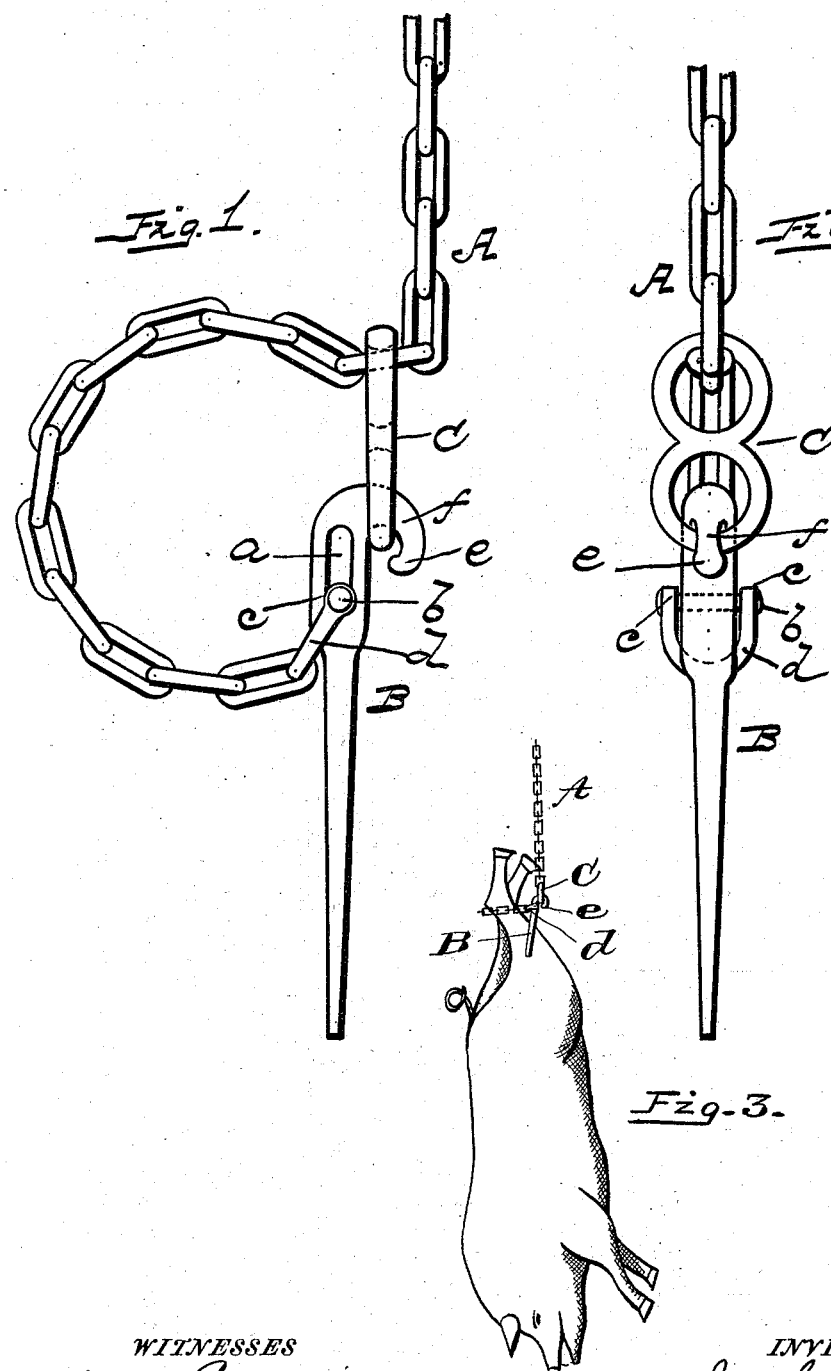

JACOB E. VANNOTE, OF CHICAGO, ILLINOIS.

DEVICE FOR SUSPENDING AND HOLDING HOGS.

SPECIFICATION forming part of Letters Patent No. 558,006, dated April 7, 1896.

Application filed January 11, 1896. Serial No. 575,159. (No model.)

*To all whom it may concern:*

Be it known that I, JACOB E. VANNOTE, a citizen of the United States, residing at Chicago, in the county of Cook and State of Illinois, have invented certain new and useful Improvements in Devices for Suspending and Holding Hogs; and I do hereby declare the following to be a full, clear, and exact description of the invention, such as will enable others skilled in the art to which it appertains to make and use the same.

This invention has relation to improvements in devices for suspending and holding stock in slaughtering-houses, and more particularly for grasping and suspending hogs by both hind legs; and it consists in the novel construction, combination, and arrangement of the parts of which it is composed, as will be hereinafter fully explained, and particularly pointed out in the appended claims.

The annexed drawings, to which reference is made, fully illustrate my invention, in which—

Figure 1 represents a side view of my device. Fig. 2 is a plan view of the same, and Fig. 3 shows the device attached to the two hind legs of a hog.

Referring by letter to the accompanying drawings, A designates an ordinary chain which I use in connection with my device, and which is preferable to other means, such as rope and the like, for suspending hogs in packing-houses.

B indicates a combined hook and lever, formed integral, and the same is provided with a slot $a$ near the hooked end, and transversely arranged within this slot is a sliding pin $b$, to the outer ends of which are secured the ends $c\ c$ of a U-shaped iron $d$, the said ends of the iron spanning the lever on the outside thereof and serve to guide the transverse pin aforesaid in its longitudinal sliding movement in the slot of the hooked lever. To this U-shaped iron the lower end of the chain is linked, thus connecting the hooked lever with said chain permanently.

C indicates a twin ring or an iron shaped similar to the figure 8, and the same is attached to the chain by the latter passing through one of its eyes, while the other eye or ring is left free to engage the hooked end of the locking-lever. This hook portion of the lever is of peculiar shape, the same having at its end a ball or enlarged portion $e$ and the neck $f$ thereof tapering from said point or enlarged portion to a much thicker part next to the lever, where it joins the same. By this construction the ring which passes over the hook is prevented from accidental displacement when the device is in use.

It will be seen from the above description, when taken in connection with the annexed drawings, that the sliding pin in the slot of the hooked lever provides a fulcrum for said lever at this point, and small pressure only is required in releasing the hook from its hold on the twin rings.

In using my device the operator simply passes the hooked end of the chain around both hind legs of a hog, after which he throws the ring over the hook, thus securing the legs by the loop thus formed in said chain, presenting a noose. The more weight upon the chain the tighter the loop becomes, and by means of the engagement of the hook and the twin rings the chain is held fast. At the same time the transverse pin remains in the end of the slot farthest from the hook, and when the loop or noose is to be released from the hog the operator throws the lever in the direction of the twin rings, when the transverse pin slides in the slot of said lever and rests in the opposite end of said slot and the hook becomes immediately disengaged from the eye or ring of the twin rings and the chain falls free from the legs of a hog, and by the arrangement of the slot in the lever with its transverse sliding pin it requires very little pressure upon the lever to disengage the hook thereof from the ring, the same acting as a fulcrum, and a device as herein described, when once applied to the hind legs of a hog, cannot slip off or become accidentally displaced, and it is simple in operation, durable, and at the same time cheap to manufacture.

Having thus described my invention, what I claim as new, and desire to secure by Letters Patent, is—

1. The combination with the suspending-chain of a lever connected to the end thereof a hook on said lever and a pair of rings formed integral one ring thereof adapted to engage said hook and the other ring engaging the suspending-chain all substantially as described.

2. In combination with the suspending-chain the double ring, the hook and slotted lever formed integral and the transverse pin and U-shaped iron all substantially as described.

In testimony whereof I affix my signature in presence of two witnesses.

JACOB E. VANNOTE.

Witnesses:
HARRY Y. DAVIS,
W. B. T. DAVIS.